(12) United States Patent          (10) Patent No.:     US 8,601,426 B1
     Du                             (45) Date of Patent:     Dec. 3, 2013

(54) MULTI-VOLTAGE DOMAIN CIRCUIT DESIGN VERIFICATION METHOD

(71) Applicant: Huabin Du, Suzhou (CN)

(72) Inventor: Huabin Du, Suzhou (CN)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/717,646

(22) Filed: Dec. 17, 2012

(30) Foreign Application Priority Data

Nov. 26, 2012 (CN) .......................... 2012 1 0487006

(51) Int. Cl.
*G06F 9/455* (2006.01)
*G06F 17/50* (2006.01)

(52) U.S. Cl.
USPC .......................................................... 716/133

(58) Field of Classification Search
USPC .......................................................... 716/133
See application file for complete search history.

(56) References Cited

U.S. PATENT DOCUMENTS

| | | | |
|---|---|---|---|
| 6,378,110 B1 | 4/2002 | Ho | |
| 7,096,447 B1 | 8/2006 | Li | |
| 7,103,862 B2 | 9/2006 | Sung | |
| 7,152,216 B2 | 12/2006 | Kapoor | |
| 7,305,639 B2 | 12/2007 | Floyd | |
| 7,574,683 B2 | 8/2009 | Wilson | |
| 7,694,251 B2 | 4/2010 | Chandramouli | |
| 7,958,475 B2 | 6/2011 | Khan | |
| 7,984,398 B1 | 7/2011 | Jedcherla | |
| 8,086,980 B2 | 12/2011 | Vogel | |
| 2006/0085770 A1* | 4/2006 | Kapoor et al. | 716/4 |
| 2008/0098338 A1* | 4/2008 | Kapoor et al. | 716/5 |
| 2008/0127015 A1* | 5/2008 | Chandramouli et al. | 716/5 |
| 2009/0183130 A1* | 7/2009 | Shephard et al. | 716/9 |
| 2010/0192115 A1* | 7/2010 | Yang et al. | 716/5 |
| 2012/0266122 A1* | 10/2012 | Newcomb et al. | 716/109 |
| 2013/0125072 A1* | 5/2013 | Newcomb | 716/107 |

* cited by examiner

*Primary Examiner* — Suresh Memula
(74) *Attorney, Agent, or Firm* — Charles Bergere (57) ABSTRACT

A level shifter physical verification system identifies missing level shifters in a multi-voltage domain integrated circuit design. The system analyzes a physical layout design data file for design to identify domains and signals that cross domains, and connected nets of devices within the IC design having one or more missing level shifters.

13 Claims, 8 Drawing Sheets

MULTI-VOLTAGE DOMAIN CIRCUIT DESIGN VERIFICATION METHOD

BACKGROUND OF THE INVENTION

The present invention relates to the field of Integrated Circuit (IC) design using Electronic Design Automation (EDA) tools, and in particular, to a method and system for verifying level shifters in a multi-voltage IC design.

IC design is now carried out using special Computer Aided Design (CAD) tools, sometimes known as EDA tools. These tools assist an IC designer to produce complex integrated circuitry, such as System on Chip (SoC) ICs, by not only assisting in the conversion of logical design parameters (from varying degrees of abstraction) into physical layout data for use in producing the semiconductor production masks, and the like, but also to aid in the testing of designs for correct operation and suitability for the chosen manufacturing process(es).

Many IC designs today make use of multiple (different) voltage domains, where each domain may be supplied by a power supply voltage optimised for its task or structure. IC designers may particularly use such multiple voltage domain architectures because they allow IC designers to implement large, complex SoCs that consume the less power, while delivering the required performance and functionality.

In digital circuits in general, a logic level is one of a finite number of states that a signal can have and is usually represented by a voltage difference between the respective signal and some common reference voltage point, such as ground (0 volts). The range of voltage levels that represents each state may depend on the logic family being used, but a typical example is the use of binary logic levels, such as "1" and "0", where, for example, "0" indicates a voltage at or near ground (0V), and "1" indicates a voltage at or near the maximum power supply voltage of the IC (or portion thereof)—e.g. 1.2V, 3.3V, 5V, etc., where the power supply voltage for the IC is 1.2V, 3.3V, and 5V respectively.

As voltages increase (or IC minimum dimensions decrease), means to avoid transistor breakdown (i.e. inbuilt protection) may need to be employed in circuits operating at the higher voltages. For example, in ICs using Metal on Silicon (MOS) type transistor technology, this protection may take the form of increasing, e.g. doubling, the gate oxide for the high voltage transistors, producing so called Double Gate Oxide (DGO) type cells.

When an IC design includes multiple voltage domains, a level shifter is used to shift a signal voltage (e.g. an output voltage) of a first power supply voltage domain to a suitable signal voltage (e.g. an input voltage) of a second power supply voltage domain or vice-versa. As such, a level shift function within an IC design may comprise, for example, shifting a logical "1" at 1.2V to a logical "1" at 3.3V (or a logical "1" at 1.2V to a logical "1" at 5V, or vice-versa), and the like. That is to say, a level shift operation may comprise either shifting the voltage from a low(er) voltage to a high(er) voltage or from a high(er) voltage to a low(er) voltage. If a level shifter is missing between two voltage domains, there will be an invalid power domain crossing. Therefore, multiple power domain IC designs need to be verified extensively for possible violations of signals not being level shifted when crossing domains.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention provides a method of identifying missing level shifters in a multi-voltage domain integrated circuit design. The present invention also provides an integrated circuit EDA system, or plug-in thereto, adapted to carry out the described method. These and other aspects of the invention will be apparent from and elucidated with reference to the embodiments described hereinafter.

The illustrated embodiments of the present invention may for the most part be implemented using electronic components and circuits known to those skilled in the art. Therefore, details will not be explained in any greater extent than that considered necessary as illustrated above, for the understanding and appreciation of the underlying concepts of the present invention and in order not to obfuscate or distract from the teachings of the present invention.

Main-stream EDA CAD tools for use in designing ICs often require the IC designer to define a complicated power specification flow for the particular IC design envisaged.

An example of a power specification flow in use today is the Common Power Format (CPF), which uses abstracted design views, and specifies power domain information and level shifter cell type rules, where a "cell" may be an individual instance of a particular entity in the design, such as transistor, and the like. For any given IC design, a corresponding CPF might specify many power related parameters, such as, but not limited to: isolation requirements, power/wattage requirements, etc. However, the CPF for a particular IC design may be overly complex to create, maintain and use, not least because it defines many parameters of an IC at once. Since IC operating voltage levels are related to the amount of power they use, the terms power domain and voltage domain may be used interchangeably herein.

Accordingly, there is provided a method, and related system means to carry out the method, to detect invalid power supply voltage domain crossing(s) between different power supply voltage domains within an IC design, in a simple yet effective way that uses minimum design inputs and processing resources. The disclosed method may be, for example, implemented as a SKILL™ script processing physical layout data in a file format such as a GDSII or OASIS file, carried out in an EDA environment. The proposed method can aid the prevention of logic signal transition failures, short-circuit currents, and the like, as well as reducing IC power consumption, and preserving the MOS junctions intended for different voltage/power domains from breakdown due to incorrect voltage domain level shifter functionality or placement.

Examples of the proposed method (that may, for example, allow the finding of missing level shifters in an IC design, but also other functional cells where appropriately labelled in the physical recognition layer(s) of the physical layout data file) may be based on using one or more physical recognition layer(s) data and/or power supply voltage information found within the physical layout database of an IC design. The physical layout database may be without voltage domain specification information and level shifter cell type information at initialisation. Examples of suitable physical layout database file types include but are not limited to: GDSII (Graphic Database System, type 2) type files and OASIS (Open Artwork System Interchange Standard) type files, but other file formats may be available and suitable for use in the proposed verification methods.

An integrated circuit design may comprise one or more 'nets', where a 'net' is a set of entities in the same voltage/power domain, i.e. devices connected to the same voltage power supply and therefore nominally having the same input/output voltage levels.

Physical layout design may distinguish between different cells, devices, etc (or nets of cells/devices) within the integrated circuit design by using specific physical recognition layers (or sub-portions thereof), for example implemented as a physical recognition layer label or parameter associated with one or more instances of a particular entity within the IC physical layout design file. The physical recognition layers may include power supply voltage domain information, and/or cell type information. For example, in a physical layout design file, a high voltage DGO transistor cell type may use a physical recognition layer label of OD_33, while a low voltage LV transistor cell type may use a physical recognition layer label of OD_12. This shows how the intended default power supply voltage level for a cell type may be easily incorporated into the physical recognition layer label for an instance of each cell type. The above example uses only two power/voltage domain levels (3.3V and 1.2V, respectively). However, the invention is not so limited, and may provide for recognition of any number of power/voltage domain levels, e.g. three levels or more.

Physical recognition layers, in, for example, a GDSII file, may also be used to allow entities (e.g. transistor cells, devices, nets, etc) within an IC design to inherit or indicate relevant characteristic information for that type of entity from prior instances of the same cell type. This may be done by copying some or all of the physical recognition layer data from a first device to a second device when the second device is physically attached to the first device in the physical layout data file, and hence formed in the same physical recognition layer.

Intended power supply voltage levels for use with particular devices, and/or instances of devices, may be included within the recognition layer data for that device type or instance of device, or may be stored in separate power supply voltage data.

The interface connections may be checked using the physical recognition layer(s) information alone, by analysing (e.g. comparing) the physical recognition layer data of different devices at either end of a selected net or connection under test (i.e. having multiple, e.g. two, end points), and if there is conflict between voltages and/or cell types indicated by respective physical recognition layer(s) data, or portions thereof, this may indicate the existence of an erroneous power domain crossing to the IC designer. As such, this deficiency may then be highlighted or labelled to the IC designer in the physical layout view, or even automatically corrected in suitable manner (e.g. a suitably configured level shifter may be automatically placed, where analysis of the physical recognition layers and/or power supply voltages of the respective entities (e.g. cells) involved in the net under test indicated one was missing).

Figure 1:
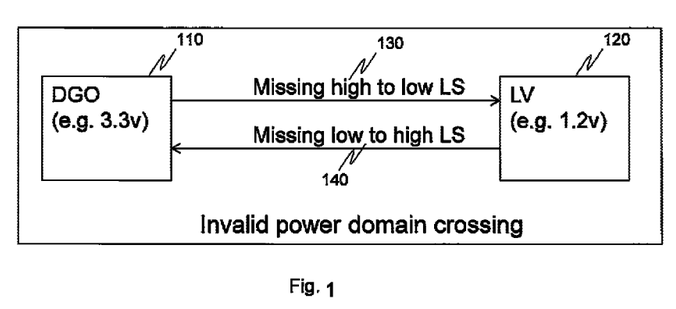
FIG. 1 is a schematic block diagram showing an example of an invalid power domain crossing, missing the required level shifters.

FIG. 1 shows an example of an invalid power supply voltage domain crossing, missing both the required level shifters. In this figure, there is a high voltage power supply domain 110 connected to a low voltage power supply domain 120, but the necessary high to low (H2L) Level Shifter (LS) is missing 130, as is the low to high (L2H) level shifter 140.

Figure 2:
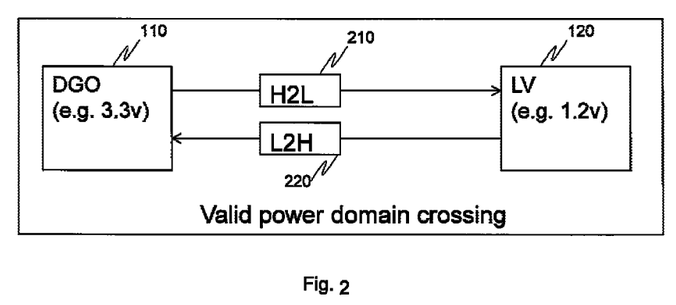
FIG. 2 is a schematic block diagram showing an example of a valid power domain crossing, using levels shifters.

FIG. 2 shows an example of a valid power supply voltage domain crossing set up for the circuit in FIG. 1, using the necessary high to low (H2L) level shifter 210 (top) and low to high (L2H) level shifter 220 (bottom).

Examples of the method of identifying one or more missing level shifters in a multi-voltage domain integrated circuit design described herein comprise receiving a physical layout design data file for the multi-voltage domain integrated circuit design (such as GDSII or OASIS data files) and analysing those received physical layout design data files to identify nets of devices (i.e. all the devices are connected together into a net) within the multi-voltage domain integrated circuit design that may have one or more missing level shifters. By using the physical design layout data, and labels thereto, the method is quick and efficient to run, and may find missing level shifters more rapidly and with less resources than would be the case in other methods, such as CPF.

The method analyzes the received physical layout design data file to identify connected nets of devices within the multi-voltage domain integrated circuit design having one or more missing level shifters by determining if there is power supply voltage data and/or physical recognition layer data in the physical layout design data file, and if not, adding respective power supply voltage data and/or physical recognition layer data to the physical layout design data file (i.e. where the data used is missing, the method may include providing that data from the abstracted design data (e.g. the logical design data, such as functional VDHL description of the mixed signal integrated circuit or the like). The power supply voltage data may be encompassed within the physical design layout data, as a set of labels or the like.

The analysis of the received physical layout design data file to identify connected nets of devices within the multi-voltage domain integrated circuit design having one or more missing level shifters may further comprise extracting power supply voltage data and/or physical recognition layer data from the physical layout design data file, and carrying out a power domain crossing check on the extracted layout using the power supply voltage and physical recognition layer data for each device instance in the multi-voltage domain integrated circuit design.

The method may also further comprise defining constraints on an extent of the multi-voltage domain integrated circuit design to be assessed in the method. A particular example, is to exclude certain portions of the design, such as, but not limited to analog portions, or IP blocks derived from a source which may, for example, guarantee the internal functionality of those IP blocks as being correct. However, the boundaries (i.e. the interconnections of such modules to other modules/IP bocks) may be included in any assessment described herein.

The method particularly further comprise defining constraints to exclude any analog portion(s) of the multi-voltage domain integrated circuit design from assessment in the method, since, for example, these may not use the same level shift circuits, in the same way.

The identification of connected nets of devices having one or more missing level shifters may comprise determining, by testing for any nets in the multi-voltage domain integrated circuit design having an invalid power domain crossing. The respective net under test may be considered a net having an invalid power domain crossing when that net has a first voltage level associated with at least one end of a net under test, and a second, different, voltage level associated with at least one other end of the net under test. This is to say, that an invalid power domain crossing may be embodied as, and therefore detectable by being, a situation where there are two (or more) different voltages nominally associated with the same net. Thus, for example, the two (or more) different voltage levels associated at different ends of a net is indicative of a missing level shifter.

The method may further comprise indicating the one or more missing level shifters in an EDA tool to the IC designer in some way, to thereby allow them to correct the error manually, if necessary (for example where the overall IC design is being hand crafted, in order to maximally optimise the performance). The indication may particularly take the form of highlighting or otherwise indicating the error in the physical design layout of the EDA tool.

Instead, or additionally, the method may further comprise inserting one or more suitably configured level shifters into the multi-voltage domain integrated circuit design where any one or more level shifters are identified as missing.

The aforementioned power domain crossing check may comprise determining an instance (or device) type (i.e. what type of device is in the IC design at that position) for each instance of a device (or other circuit entity) within a net under test, said instance type including indications of an intended voltage level (e.g. actual power supply in use and/or power supply voltage that can in theory be used with said device) to be used with that particular instance of a device entity in the net under test. These indications may be derived from the physical design layout data, including recognition layer data and associated labels, especially power supply voltage level data.

The power domain crossing check may also comprise determining an actual power supply voltage in use with each instance of a device entity in the net under test and determining if there is an invalid voltage level by comparison of the intended power supply voltage connection for a particular instance and the actual power supply voltage for the same instance of each device entity in the net under test. The actual power supply voltage connection data may take greater priority than the intended voltage for an instance of each device entity within the net under test—i.e., for example, where a device is capable of being operated on multiple power supply voltages, then the actual power supply voltage in use for that instance may be the determining factor.

The instance type for each instance of a device entity within the net under test may include the intended power supply voltage and the actual power supply voltage connection for use with each instance of a device entity, and these may be determined from one or more power supply voltage data and/or physical recognition layer data in the physical layout design data file.

Figure 3:
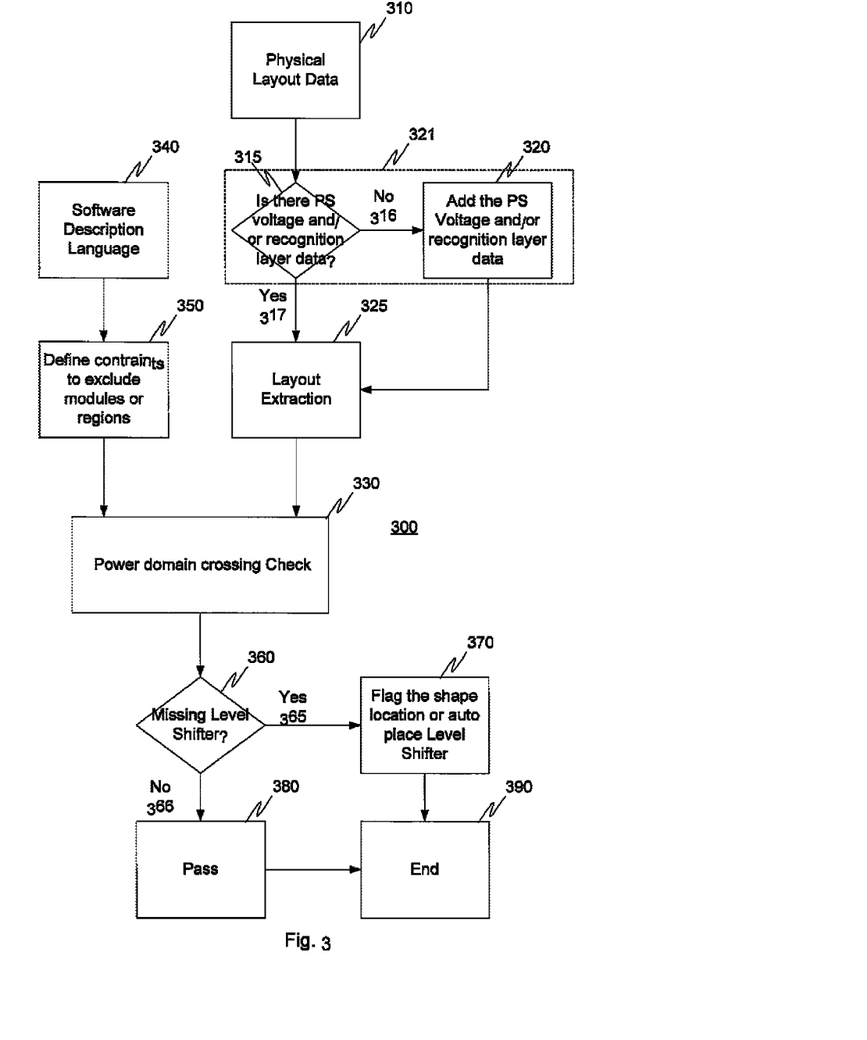
FIG. 3 is a flow chart of a method of level shifter placement verification according to an embodiment of the invention.

FIG. 3 shows in more detail an example method of level shifter placement verification 300 according to an example of the invention. The method starts by taking the physical layout data file 310 (e.g. a GDSII or OASIS file) and determining whether there is any power supply (PS) voltage information (i.e. data indicative of respective power supply voltage(s) to be used with an entity within the physical design layout) and/or physical recognition layer values present within the physical layout data file 315. If there are suitable PS voltage and/or physical recognition layer data present, 317, then the method proceeds to use these data values as described below. If not or if not enough are present to cover the area of the IC design being assessed for correct level shifter placement, 316, the method may comprise adding suitable PS voltage supply and/or physical recognition layer data values to the physical layout data file 320, from which to carry out the remaining parts of the described method. The addition of suitable PS voltage supply and/or physical recognition layer data may be a one off process (as shown in hard line), or may be an iterative process that gradually adds the respective information over several passes (indicated by a dashed line box, 321). The respective power supply and/or recognition layer data may be derived from other abstractions of the IC design, or manually added by the IC designer.

The method proceeds, potentially after it has ensured all necessary PS voltage information and/or physical recognition layer data is present, to layout extraction 325 that extracts the respective PS voltage information and physical recognition layer data values for analysis in the subsequent power domain crossing check 330 portion of the method.

Optionally, the method may also comprise using a software description language 340, or similar, to define other relevant constraints to the later analysis of the extracted physical layout. For example, these constraints may be used to exclude predefined portions (e.g. individual modules or regions, or the like) of an overall integrated circuit design. For example, only the digital portions of an integrated circuit design may be analysed for level shift violations, in which case these constraints may be used to exclude the analog portions of the integrated circuit design under test (i.e. level shifter review).

The existence of power level shift violations (i.e. invalid voltage/power domain crossings) may be tested by carrying out a power domain crossing check 330 using the physical recognition layers of the physical layout design file and/or power supply voltage information for each instance of an entity in the net. The power supply voltage domain crossing check portion of the method may further comprise checking for missing level shifters 360, and if missing level shifters are found 365, flagging these violations in the shape data 370 (i.e. flagging up the error to the IC designer, for example, by highlighting a relevant shape in the physical design layout view, including a relevant "error" label or by highlighting a label/parameter for the shape, e.g. in red, or another visually dominant colour) or automatically correcting for the error found, e.g. automatically inserting a suitable level shifter. The invention is not intended to be limited by the way in which the error, once found, is highlighted, corrected or otherwise dealt with. Where no power supply crossing violations are found, the method may 'pass' the IC design 380. Either way, the method ends at 390 when all potential violations are checked for and accepted as correct, or suitably highlighted to the IC designer/corrected.

An example of how physical recognition layer values may be inherited between nets will now be explained with reference to FIGS. 4 to 7.

Figure 4:
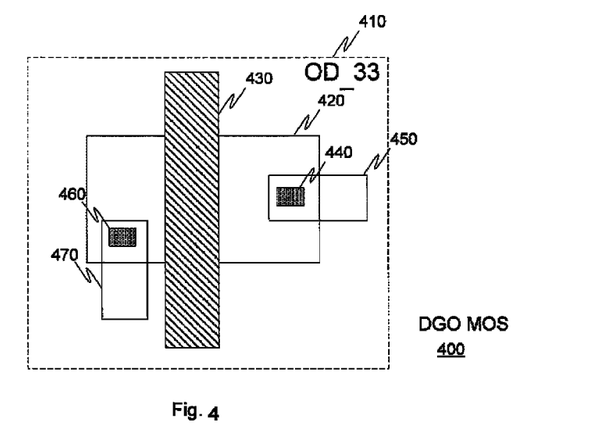
FIG. 4 is a schematic diagram of an example layout of a single instance of a DGO MOS transistor suitable for use in a high voltage power domain or low voltage power domain.

FIG. 4 shows an example physical layout representation of a single instance of a DGO MOS transistor cell, here indicated by use of the OD_33 physical recognition layer label (but other labels may be used instead). A DGO transistor is one suitable for use in a high voltage power domains or low voltage power domains. As such, FIG. 4 shows the generic layout of a DGO transistor cell without any indications as to which power supply is being used, and hence which voltage domain applies in this instance.

The physical layout representation is typically used to show an IC designer how the particular cell is formed (i.e. physically laid out) on/in the semiconductor substrate using areas of different material types, doping levels, etc., as is understood in art of, for example, planar semiconductor manufacturing processes. The physical layout representation may be typically stored in a data file detailing the relative positions, sizes, layer types, materials, etc, used to form the respective cells (e.g. DGO, or Low Voltage, etc.), and other physical layout data. Example physical layout data files include GDSII and OASIS file types, but others are envisaged as suitable for use in the disclosed method and system.

Returning to FIG. 4, the DGO transistor type is inherently able to cope with both high and low voltages because the double gate oxide prevents junction breakdown, and the like, at high operating voltages, but this does not prevent their use at low voltage(s) as well. However, performance of DGO cells at low voltage may not be as good as a specifically formed LV type transistor cell. For example, DGO cells operating at low voltages may not operate as fast, or the like. Thus, some examples of the present invention may also use analysis the physical recognition layer data and/or power supply voltage information in a physical layout data file (e.g. GDSII file) to detect and highlight or correct instances where a less than ideal entity is used in a particular IC design under test (for example, where a DGO LV cell is used instead of a dedicated LV type cell). Such examples of the present invention may therefore provide a means to optimise an IC design for reduced power consumption and/or increased speed of operation. Some examples of the invention may optionally also allow a particular Integrated Circuit design to be analysed at the physical layout level, and a form of safety margin (e.g. operating voltage head room) included therein. For example, by converting any low power/voltage devices operating at low voltage to high voltage devices also operating at low voltage. In the specific examples above, this may take the form of converting Low Voltage devices into DGO devices.

For clarity, the physical layout representation type figures in this disclosure do not show the doping polarity of the semiconductor substrate, etc (i.e. whether the transistor is an NPN or PNP type), as this would otherwise overly obscure the drawings with extra shaded layers/area, thereby making the figures harder to understand.

In FIG. 4, there is shown an instance of a DGO type cell 400, and the fact the transistor is a DGO type cell is effectively shown by the use of OD_33 physical recognition layer label, 410.

The DGO cell includes an area 420 of suitably doped semiconductor substrate forming the drain/source/channel of the transistor. Across (and above, as per standard planer transistor construction) this is placed a polysilicon gate 430 with a double gate oxide layer between the polysilicon of the gate and doped silicon of the channel, to form, for example, a Drain on the left hand side and Source on the right hand side (the Drain and Source may be interchanged, according to the polarity/type of DGO cell, and how the respective sides are onwardly connected). The figure also shows, on the right hand side, an aperture for a signal coupler or conduit, e.g. via 440, allowing connection of, for example, a metal track at a certain voltage 450, e.g. VDDHI, VDDLO, VSS or any other input/output signal voltage. Similarly, on the left hand side, there is provided another via 460 to couple to another, e.g., metal track at a certain voltage 470. No via is shown for the connection to the polysilicon gate for clarity, but its existence and use would be apparent to the person skilled in the relevant art (see FIG. 5 or 12, for example).

Figure 5:
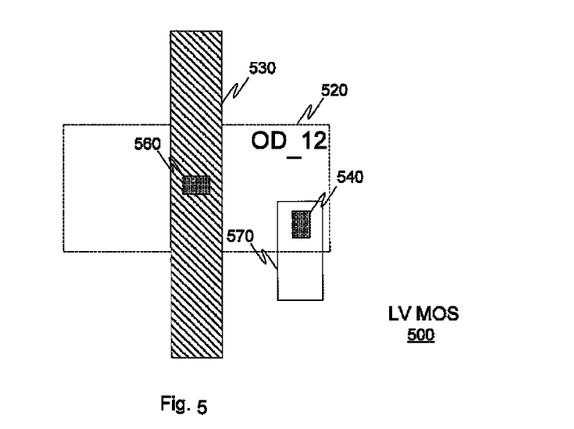
FIG. 5 is a schematic diagram of an example layout of a single instance of a Low Voltage (LV) MOS transistor for use in a low voltage power domain.

FIG. 5 shows an example layout of a single instance of a Low Voltage (LV) MOS transistor 500, for use in a low voltage power domain (in this case, as indicated by use of the OD_12 physical recognition layer label). The LV transistor similarly comprises an area 520 of suitably doped semiconductor substrate forming the drain/source/channel of the transistor. Across this is placed a polysilicon gate 530, but this time with a single oxide layer between the polysilicon gate and doped silicon of the channel, to form, for example, a Drain on the left hand side and Source on the right hand side (the Drain and Source may be interchanged, according to the polarity/type of LV cell, much like is the case for DGO cells). The figure also shows, on the right hand side, an aperture for a signal coupler or conduit, e.g. via 540, allowing connection of the Drain/Source to a metal track at a certain voltage 570, e.g. VDD (HI/LO), VSS or any other input/output signal voltage. No equivalent aperture is show on the left hand side of FIG. 5, for clarity (but it would like items 460/470 of FIG. 4), but there is provided a via 560 to show how the polysilicon gate is coupled to its metal tracks leading in/out to the rest of the integrated circuit.

Figure 6:
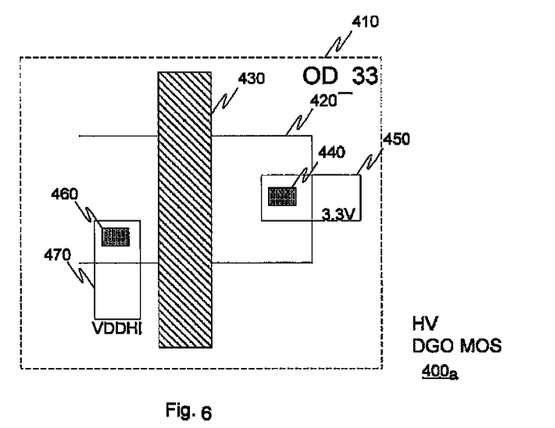
FIG. 6 is a schematic diagram of a more detailed example view of the layout of FIG. 4, including power domain values for a high voltage power domain.

FIG. 6 shows a more detailed example view of the layout of FIG. 4, for a high voltage DGO MOS (OD_33) formation 400a, including power supply voltage values for a high voltage power domain (i.e. VDDHI power supply and related 3.3V output signal), as typically shown in the physical layout representation of a proposed IC design in the physical layout portion of an IC design software suite, using, for example GDSII or OASIS physical layout data file types. Notable is the inclusion of the VDDHI and 3.3V voltage labels, for the power supply voltage and related signal output voltage respectively, in the physical recognition layers, for the Source/Drain connections, which indicate a high voltage use instance of the DGO cell, and which are used in the described verification method.

Figure 7:
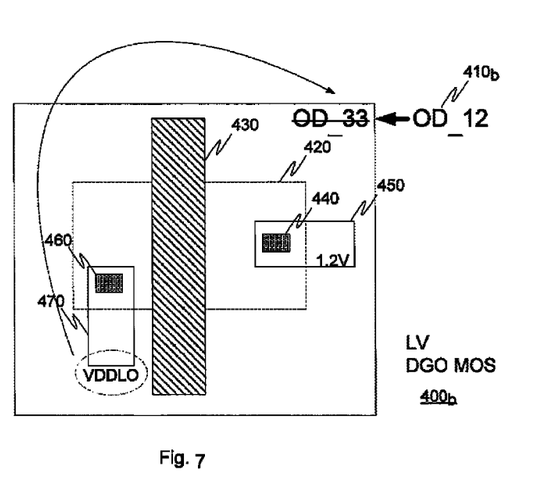
FIG. 7 is a schematic diagram of an example having the same layout of FIG. 6, but including alternative values for a low voltage power domain.

FIG. 7 is an example Low Voltage DGO MOS 410b having largely the same physical layout as the HV DGO MOS 400a of FIG. 6, but including alternative voltage values for a low voltage power supply domain, particularly 'VDDLO' and '1.2V' voltage labels for the metal tracks coupled to the Source and Drain, indicating the (low) voltage for the power supply and the resultant expected low voltage output signal, respectively. In FIG. 7, the fact that the otherwise High Voltage DGO type cell is, in this case, being used at low voltage is determined based upon the use of a power supply voltage label of the power supply connection being 'VDDLO', i.e. the power supply voltage data, VDDLO, effectively overrules the actual physical recognition layer label OD_33 (which would otherwise indicate a device to be used at 3.3V). This 'alteration' of the base assumed power supply voltage may be carried out on the fly (i.e. labels stay the same, but the method knows to overrule the recognition layer label in light of the power supply voltage label), or the method may further comprise actually amending the respective recognition layer label in the physical layout data file to a suitable value, which is indicated in FIG. 7 by replacing the original OD_33 recognition layer label with the alternative label, OD_12, 410b.

Figure 8:
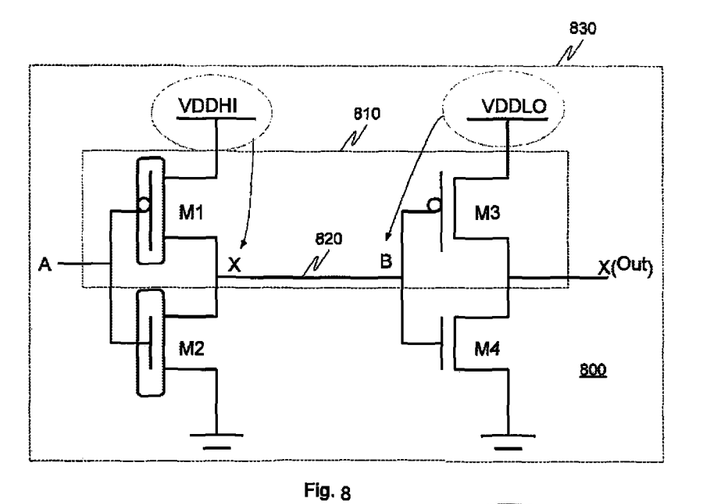
FIG. 8 shows an example schematic diagram of a full level shifter circuit including two LV and two DGO MOS transistors exhibiting an invalid power domain crossing.

FIG. 8 shows a schematic diagram 800 of a full level shifter circuit comprising two HV DGO MOS transistors 400a (on left of Figure) and two LV MOS transistors 500 (on right of Figure), as an example exhibiting an invalid power domain crossing 820. In this figure, the level shifter circuit 800 comprises a first push-pull follower formed out of the two HV DGO transistors M1 and M2 and having an input, A, and an output, X. Due to the nature of the push-pull follower circuit, when the output X is made "high", it tends towards the power supply voltage, in this case VDDHI (e.g. 3.3V). This is shown by the arrow going from a circled VDDHI towards X.

Meanwhile, the output X (of the M1/M2 transistors) forms the input, B, to the second push-pull follower formed from LV transistors M3 and M4, and having an output X(Out). However, since the input voltage to these LV transistors, X, is being pulled up to the VDDHI power supply voltage level (3.3V in this case), its value is higher than their intended supply voltage, VDDLO (e.g. 1.2V). This means there is now an invalid power supply voltage domain crossing present in this case. Put simply, for the M1/M2 first push-pull follower of FIG. 8, output X inherits the value of its power supply voltage, i.e. VDDHI, whereas, for the M3/M4 second push-pull follower input gate B should be low voltage, because it inherits an expected voltage of up to VDDLO, i.e. the power supply voltage for that instance. A net cannot have two different power supply voltage properties at either end. Thus, if output X connects directly with B, a voltage conflict will be caught between the X-net and B-net. Thus an invalid power supply voltage domain crossing has been detected in the physical layout file, by use of respective OD_33, and OD_12 physical recognition layer labels, and the power supply voltage values attached thereto (e.g. VDDHI or VDDLO).

Figure 9:
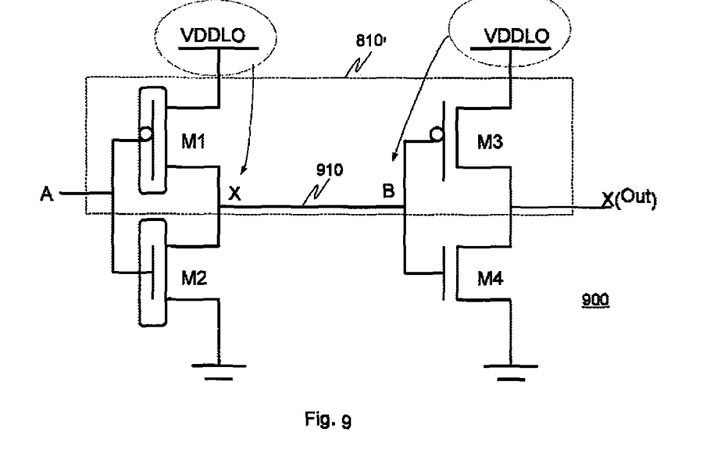
FIG. 9 shows an example schematic diagram of a full level shifter circuit including two LV and two DGO MOS transistors exhibiting a valid power domain crossing.

FIG. 9 shows a schematic diagram 900 of the same full level shifter circuit of FIG. 8, but this time comprising the correct use of two LV DGO MOS transistors as M1 and M2 (as denoted here by using VDDLO on an OD_33 cell instance), and therefore exhibiting a valid power supply voltage domain crossing 910. Put simply, for the M1/M2 first push pull follower of FIG. 9, output X inherits VDDLO by use of physical recognition layer OD_33 (which, on its own, would imply connection to VDDHI), but here this implication is overridden by its actual connection to a power supply voltage of VDDLO, and as before for the M3/M4 second push-pull follower, the gate input B should be low voltage, as shown by use of the physical recognition layer OD_12 (and there being no overriding power supply voltage connection in use). In this case, the net has the same low voltage properties on both ends, and so there is no voltage conflict caught between the X-net and B-net. Thus a valid power supply voltage domain crossing has been detected in the physical layout file, by use of respective OD_33, and OD_12 physical recognition layer labels, and the voltage supply rails attached thereto (e.g. VDDHI or VDDLO).

Use of physical recognition layer labels and power supply voltage labels in the physical layout representation file (e.g. GDSII or OASIS) to detect invalid power domain crossings, as exemplified by FIGS. 8 and 9 discussed above, in accordance with example methods and apparatuses according to embodiments of the invention may also be described with reference to the physical layout representation of these schematic diagrams.

Figure 10:
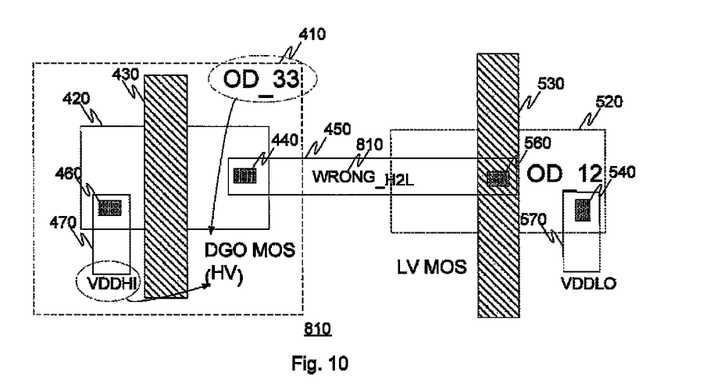
FIG. 10 is a schematic diagram showing the invalid power domain crossing portion of FIG. 8 in more detailed physical layout form.
Figure 11:
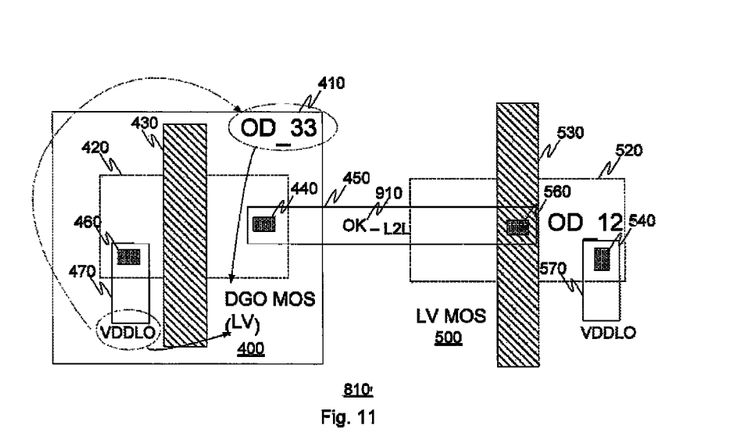
FIG. 11 is a schematic diagram showing the valid power domain crossing portion of FIG. 9 in more detailed physical layout form.
Figure 12:
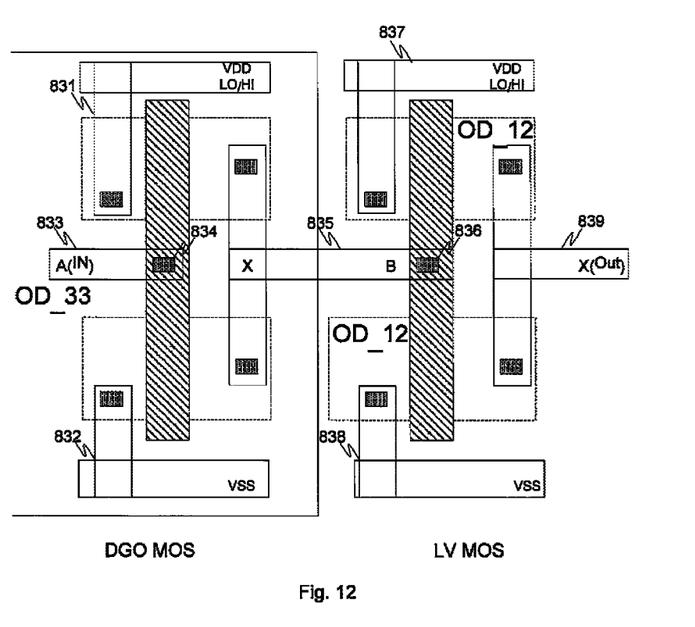
FIG. 12 shows an example physical layout of a full level shifter circuit.

These physical layout representations are shown in FIGS. 10 to 12, where FIG. 10 is selection 810 (an invalid power supply voltage domain crossing, 820) of FIG. 8, FIG. 11 is selection 810' (a valid power supply voltage domain crossing, 910) of FIG. 9, and FIG. 12 shows a more detailed physical layout 830, which actually applies to both cases, since the type and layout of the devices in use are the same, and it is only the value of the respective power supply voltages (VDDHI/VDDLO) in use with the DGO MOS cells that has changed (and FIG. 12 does not specify the power supply voltages used per se, it allows both options). FIGS. 10 and 11 only show the pertinent portions of FIGS. 8 and 9 respectively, in order not to obscure the invention. However, FIG. 12 is provided to give at least one more complete layer structural representation, to provide better context for the understanding of the invention as a whole.

In FIGS. 10-12, the physical layout representation of the respective portion of the overall IC design is shown, where the physical recognition layers are provided with respective labels. The physical recognition layer labels may indicate the type of transistor topology in use and any expected/intended power supply voltage levels to be used (e.g. OD_33 or OD_12), and the voltage label(s) of respective connected supply rails indicate the voltage actually in use (LV or HV, i.e. use of VDDLO and VDDHI, respectively).

In effect, examples of the invention, as applied to detecting valid level shifter placement (i.e. the process of level shifter placement verification) determines the net voltage property of two ends of a connection, given the surrounding use of particular cell types and expected voltages to be used with them, and if those net voltage properties are not equal, it is ascertained that a suitable level shifter (high to low, or low to high) is missing.

In the examples shown, the physical recognition layer label of a particular instance of a cell decides the intended input voltage for that cell, so OD_12 physical recognition layer label means a low voltage, whereas OD_33 physical recognition layer label means a high voltage. Meanwhile, for the same particular instance of a cell, the actual power supply voltage(s) in use (i.e. connected to a respected power supply input for an instance of a particular device/cell) may decide the intended input/output voltage, so, for example, a power supply voltage that is VDDHI indicates the output should be VDDHI, whereas if the power supply voltage is VDDLO then output should also be VDDLO. Therefore, where instances (or nets of instances) are coupled together, the intended power supply voltage level (e.g. output) of one instance is compared to the intended power supply voltage level (e.g. input) of the instance to which it is connected, and if they mismatch, there is a missing level shifter.

The net voltage property of a connection is therefore based on the physical recognition layer data (e.g. label) and/or power supply voltage data value(s) for that instance of a particular cell type, where the power supply voltage may be, for example, derived from the physical recognition layer label/values itself or may be separate values within the physical recognition data. In either case, the data values may be inheritable values, derived from other instances of the same or similar entities in the physical layout file. The respective data is derived through extraction from the relevant source file, such as GDSII or OASIS, or any other functionally equivalent physical layout type data file in use now or in the future. This may be done with priority order, for example first priority being given to the voltage power value in use (e.g. VDDHI or VDDLO) and a second priority being given to the physical recognition layer extraction label value for the entity involved (e.g. OD_33 or OD_12, in these examples). In this way, examples of the invention may correctly assess a physical layout file, such as a GDSII file, to determine the existence of any invalid power supply voltage domain crossings. Carrying out such an assessment at this level of abstraction can be significantly less complex and time consuming than if done elsewhere in the design process, and/or in other ways, such as by use of CPF mentioned above. Furthermore, once detected, these invalid power supply domain crossings may be indicated to the IC designer when in the physical layout representation view of an IC design, and so may be corrected more easily and with sight of the rest of the physical layout of the IC design under test/review.

At the individual device/cell level, the above assessment may be described as follows:

For working out the correct output voltage for a device/cell (e.g. related to either the Source (S) or Drain (D) of an above-described DGO transistor, OD_33) at a certain power supply voltage, then the respective output voltage may only inherit the power supply voltage value. For example, when determining whether the output voltage expected to be seen when the Source for a DGO transistor is connected to VDDLO, then the output voltage=the power supply voltage, VDDLO, i.e. the expected output voltage simply copies the input power supply voltage value. Thus, only the power supply voltage information may be used here.

Whereas, for working out the correct input voltage for a device/cell (e.g. related to the Gate (G) of an above-described DGO transistor) at a certain power supply voltage, then the respective input voltage may inherit the power supply voltage value from the recognition layer, as altered by the power supply voltage in use for that instance, as described above. For example, when determining whether the input Gate voltage expected to be seen for a DGO transistor Gate (OD_33), when the Source for that DGO transistor is connected to VDDLO, then the input voltage=OD_12 (i.e. OD_33 altered to become OD_12, because the power supply voltage is VDDLO for that instance).

In the foregoing, a net voltage value may be set to 3.3v, if the respective physical recognition layer power value reads 'VDDHI', and a net voltage may be set to 1.2v, if the respective physical recognition layer power value reads 'VDDLO'. However, other voltage levels may be used for VDDHI or VDDLO instead. For example, VDDHI may be 5V. The respective physical recognition layers can therefore be suitable labelled, e.g. OD_5 for 5V operation. In the above description, the fact that DGO cells may be used in low voltage situations may be covered by noting that whilst the physical recognition layer value 'OD_33' with power supply input voltage 'VDDHI' indicates an output net voltage of 3.3v, the use of 'OD_33' with power supply input voltage 'VDDLO' will indicate the output net voltage is 1.2v.

In FIG. 10 the power/voltage domain crossing violation can be detected by using device physical recognition layers and power supply voltage values, this case, the left hand DGO cell has a physical recognition layer OD_33, and a voltage supply input of VDDHI, whereas the right hand side LV cell uses physical recognition layer OD_12, and so analysis on these values would indicate a mismatch between the high voltage requirements of the left hand side, with the low voltage requirements of the right hand side, hence the determination of there being no suitable High to lower level shifter in place, and therefore the error "WRONG_H2L" label can be shown in the physical layout representation, as shown.

In FIG. 11, a correct formation is shown, and the above described assessment using physical recognition layer (OD_12 and OD_33) and power supply voltage values (VDDLO for OD_33, making it low voltage) shows the IC design here is correctly formed, and does not have an invalid power supply voltage domain crossing.

FIG. 12 shows the whole level shifter circuit in more detail, and particularly shows how points A, X, B and X(Out) are formed by suitable interconnection between the two instances of the LV DGO MOS cells and the two instances of LV MOS cells. In particular, there is shown on the left hand side a first metal track connection to VDDHI/VDDLO 831, a second metal track connection to VSS 832, and a third metal track input for A, 833. Meanwhile, in the middle of the circuit, there is shown a fourth metal track type connection between point X and B 835, in this case linked to the polysilicon gate using a Via 836. The right hand side of the circuit in FIG. 12 also includes a fifth metal track to power supply voltage VDDHI/VDDLO 837, a sixth metal track to VSS 838 and the seventh, output metal track 839. The specific form of level shifter arrangement shown in FIG. 12 is only exemplary, and the invention is not so limited.

Figure 13:
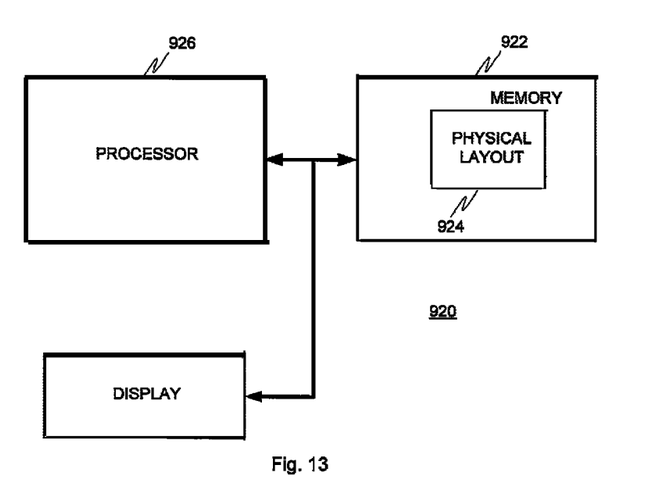
FIG. 13 shows a system for verifying a multi-voltage domain integrated circuit (IC) design in accordance with an embodiment of the present invention.

The method and process described above can be implemented as an Electronic Design Automation (EDA) tool comprising a mixture of hardware components, software modules and design data files. FIG. 13 shows a system 920 for verifying a multi-voltage domain integrated circuit (IC) design in accordance with an embodiment of the present invention. The system 920 includes a memory 922 for storing a physical layout design data file 924 for the IC design. The memory 922 is coupled to one or more processors 926 (only one is shown) that function in accordance with an operating system, e.g., Unix such that the processors are capable of executing software code or programs. In this embodiment, the system 920 includes means for analysing the physical layout design data file to identify connected nets of devices within the IC design having one or more missing level shifters, and means for inserting one or more suitably configured level shifters into the IC design where any one or more missing level shifters are identified. In this embodiment, the means for analysing the physical layout design data file determines if there is power supply voltage data and/or physical recognition layer data in the physical layout design data file 924 stored in the memory 922 and, if not, adds power supply voltage data and/or physical recognition layer data to the physical layout design data file 924. The means for analysing the received physical layout design data file includes a means for extracting power supply voltage data and/or physical recognition layer data from the physical layout design data file, and means for performing a power domain crossing check on the extracted layout data using the power supply voltage and physical recognition layer data for each device instance in the IC design. The means for performing the power domain crossing check comprises means for determining an instance type for each instance of a device entity within a net under test, where the instance type is indicative of an intended voltage level to be used with each instance of a device entity in the net under test; means for determining an actual power supply voltage connection for use with each instance of a device entity in the net under test; and means for determining if there is an invalid voltage level by comparison of the intended power supply voltage connection for a particular instance and the actual power supply voltage for the same instance of each device entity in the net under test. In one embodiment, the actual power supply voltage connection data takes greater priority than the intended voltage for an instance of each device entity within the net under test. Further, the instance type for each instance of a device entity within the net under test including intended power supply voltage and the actual power supply voltage connection for use with each instance of a device entity are determined from one or more power supply voltage data and/or physical recognition layer data in the physical layout design data file 924. It will be readily understood by those of skill in the art that the means-for elements described above comprise a combination of the processor 926 executing software instructions. The system 920 also may include a display, such as one or more high resolution monitors for displaying the physical design data and flag data indicating missing level shifters.

It will be appreciated that examples of the invention provides an effective, yet simple way to find invalid power supply voltage domain crossings in an IC design when the IC designer is in the physical layout view of a circuit under design. This verification process uses only physical recognition layer data (where it includes power supply voltage information) or physical recognition layer data and power supply voltage data is stored separately to one another, as already provided in cell layout data in, for example, GDSII or OASIS data files. It is simple and easy to use, and more reliable than other more complex methods, such as CPF, most notably because there is reduced data entry requirements on the IC designer, and hence a reduced likelihood of error occurring.

Examples of the invention may be implemented within existing IC design EDA/CAD tools, such as an updated version of a particular EDA/CAD tool, or a EDA/CAD plug-in to an existing tool, to be included into the EDA/CAD low power design flow and PDK (Physical Design Kit) tool set. For example, the described method may be carried out as a SKILL™ script acting upon the GDSII data file. Other scripting languages other than SKILL may also be used.

Therefore, as such, examples of the invention may also be implemented as a computer program for running on a computer system, at least including executable code portions for performing steps of any method according to embodiments the invention when run on a programmable apparatus, such as a computer system or enabling a programmable apparatus to perform functions of a device or system according to embodiments the invention.

A computer program may be formed of a list of executable instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a suitable computer system.

The computer program may be stored internally on a computer readable storage medium or transmitted to the computer system via a computer readable transmission medium. All or some of the computer program may be provided on computer readable media permanently, removably or remotely coupled to the programmable apparatus, such as an information processing system and may be tangible and non-transitory. The computer readable media may include, for example and without limitation, any one or more of the following: magnetic storage media including disk and tape storage media; optical storage media such as compact disk media (e.g., CD-ROM, CD-R, Blueray, etc.) digital video disk storage media (DVD, DVD-R, DVD-RW, etc.) or high density optical media (e.g. Blueray, etc); non-volatile memory storage media including semiconductor-based memory units such as FLASH memory, EEPROM, EPROM, ROM; ferromagnetic digital memories; MRAM; volatile storage media including registers, buffers or caches, main memory, RAM, DRAM, DDR RAM etc.; and data transmission media including computer networks, point-to-point telecommunication equipment, and carrier wave transmission media, and the like. Embodiments of the invention are not limited to the form of computer readable media used.

A computer process typically includes an executing (running) program (which may be tangible and non-transitory in nature) or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific level shifter placement verification examples of embodiments of the invention. It will, however, be evident that various modifications and changes may be made therein without departing from the broader scope of the invention as set forth in the appended claims.

The semiconductor substrate described herein can be any semiconductor material or combinations of materials, such as gallium arsenide, silicon germanium, silicon-on-insulator (SOI), silicon, monocrystalline silicon, the like, and combinations of the above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Terms like assert, set, negate, and clear are used herein when referring to the rendering of a signal or bit into its logically true or logically false state, respectively. If the logically true state is a logic level one, the logically false state is a logic level zero and vice-versa.

Furthermore, those skilled in the art will recognize that boundaries between the above described process steps are illustrative and that multiple steps could be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type, for example VHDL (Very high speed integrated circuits Hardware Description Language).

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

Unless otherwise stated as incompatible, or the physics or otherwise of the embodiments prevent such a combination, the features of the following claims may be integrated together in any suitable and beneficial arrangement. This is to say that the combination of features is not limited by the specific form of claims below, particularly the form of the dependent claims, as such a selection may be driven by claim rule sin respective jurisdictions rather than actual intended physical limitation(s) on claim combinations.

The invention claimed is:

1. A method of identifying one or more missing level shifters in a multi-voltage domain integrated circuit (IC) design, the method comprising:
   receiving a physical layout design data file for the IC design;
   analysing the received physical layout design data file to identify connected nets of devices within the IC design having one or more missing level shifters, comprising:
      extracting power supply voltage data and/or physical recognition layer data from the physical layout design data file, and
      perform a power domain crossing check on the extracted layout data using the power supply voltage and physical recognition layer data for each device instance in the IC design, wherein the power domain crossing check comprises,
         determining an instance type for each instance of a device entity within a net under test, said instance type indicative of an intended voltage level to be used with said each instance of a device entity in the net under test,
         determining an actual power supply voltage connection for use with each instance of a device entity in the net under test, and
         determining if there is an invalid voltage level by comparison of the intended power supply voltage connection for a particular instance and the actual power supply voltage for the same instance of each device entity in the net under test; and
   inserting one or more suitably configured level shifters into the IC design where any one or more missing level shifters are identified.

2. The method of claim 1, wherein analysing the received physical layout design data file comprises:
   determining if there is power supply voltage data and/or physical recognition layer data in the physical layout design data file; and
   if not, adding power supply voltage data and/or physical recognition layer data to the physical layout design data file.

3. The method of claim 1, wherein the actual power supply voltage connection data takes greater priority than the intended voltage for an instance of each device entity within the net under test.

4. The method of claim 1, wherein the instance type for each instance of a device entity within the net under test including intended power supply voltage and the actual power supply voltage connection for use with each instance of a device entity are determined from one or more power supply voltage data and/or physical recognition layer data in the physical layout design data file.

5. The method of claim 1, further comprising defining constraints on an extent of the IC design to be analysed.

6. The method of claim 5, further comprising defining constraints to exclude any analog portion(s) of the IC design from being analysed.

7. The method of claim 1, wherein identifying connected nets of devices having one or more missing level shifters comprises determining, by testing, any nets in IC design having an invalid power domain crossing, wherein a net having an invalid power domain crossing has a first voltage level associated with at least one end of a net under test, and a second, different, voltage level associated with at least one other end of the net under test.

8. The method of claim 7, wherein different voltage levels associated at different ends of the net are indicative of a missing level shifter.

9. A system for verifying a multi-voltage domain integrated circuit (IC) design, the system comprising:
- a memory for storing a physical layout design data file for the IC design;
- means for analysing the physical layout design data file to identify connected nets of devices within the IC design having one or more missing level shifters, comprising:
  - means for extracting power supply voltage data and/or physical recognition layer data from the physical layout design data file, and
  - means for performing a power domain crossing check on the extracted layout data using the power supply voltage and physical recognition layer data for each device instance in the IC design, comprising,
    - means for determining an instance type for each instance of a device entity within a net under test, said instance type indicative of an intended voltage level to be used with said each instance of a device entity in the net under test;
    - means for determining an actual power supply voltage connection for use with each instance of a device entity in the net under test, and
    - means for determining if there is an invalid voltage level by comparison of the intended power supply voltage connection for a particular instance and the actual power supply voltage for the same instance of each device entity in the net under test; and
  - means for inserting one or more suitably configured level shifters into the IC design where any one or more missing level shifters are identified.

10. The system of claim 9, wherein the means for analysing the physical layout design data file,
- determines if there is power supply voltage data and/or physical recognition layer data in the physical layout design data file; and
- if not, adds power supply voltage data and/or physical recognition layer data to the physical layout design data file.

11. The system of claim 9, wherein the actual power supply voltage connection data takes greater priority than the intended voltage for an instance of each device entity within the net under test.

12. The system of claim 9, wherein the instance type for each instance of a device entity within the net under test including intended power supply voltage and the actual power supply voltage connection for use with each instance of a device entity are determined from one or more power supply voltage data and/or physical recognition layer data in the physical layout design data file.

13. The system of claim 9, wherein the physical layout design file is a GDSII or OASIS data file.

* * * * *